(12) United States Patent
Shimamura

(10) Patent No.: US 8,708,419 B2
(45) Date of Patent: Apr. 29, 2014

(54) VEHICLE SEAT

(75) Inventor: Kozo Shimamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 13/197,730

(22) Filed: Aug. 3, 2011

(65) Prior Publication Data

US 2012/0032485 A1 Feb. 9, 2012

(30) Foreign Application Priority Data

Aug. 3, 2010 (JP) ................................. 2010-174421

(51) Int. Cl.
*B60N 2/44* (2006.01)

(52) U.S. Cl.
USPC .................................. 297/463.1; 297/354.12

(58) Field of Classification Search
USPC .................... 297/344.1, 354.1, 354.12, 463.1
See application file for complete search history.

(56) References Cited

U.S. PATENT DOCUMENTS

| | | | | |
|---|---|---|---|---|
| 3,957,312 | A * | 5/1976 | Bonnaud | 297/341 |
| 4,437,703 | A * | 3/1984 | Nishikori et al. | 297/362 |
| 4,995,669 | A * | 2/1991 | Croft | 297/378.12 |
| 7,472,963 | B2 * | 1/2009 | Jeong | 297/463.1 |
| 7,862,121 | B2 * | 1/2011 | Ishijima et al. | 297/367 R |
| 7,938,490 | B2 * | 5/2011 | Ishijima et al. | 297/358 |
| 7,959,229 | B2 * | 6/2011 | Ishijima et al. | 297/344.1 |
| 8,353,561 | B2 * | 1/2013 | Yamazaki et al. | 297/463.1 |
| 2006/0185968 | A1 * | 8/2006 | Dzioba | 200/5 R |
| 2010/0066137 | A1 * | 3/2010 | Sakai et al. | 297/217.3 |

FOREIGN PATENT DOCUMENTS

| | | |
|---|---|---|
| JP | S50-2987 U | 1/1975 |
| JP | H05-95341 U | 12/1993 |
| JP | H07-27934 U | 5/1995 |
| JP | 3293513 | 9/1998 |
| JP | 2002-274228 A | 9/2002 |
| JP | 2006-273063 A | 10/2006 |
| JP | 2007-196896 A | 8/2007 |
| JP | 2008-74150 A | 4/2008 |

OTHER PUBLICATIONS

Japanese Office Action for corresponding JP Application No. 2010-174421, Jan. 10, 2012.
Japanese Office Action for corresponding JP Application No. 2010-174421, Apr. 6, 2012.

* cited by examiner

*Primary Examiner* — Peter Brown
(74) *Attorney, Agent, or Firm* — Ditthavong Mori & Steiner, P.C.

(57) ABSTRACT

A vehicle seat includes a seat cushion, a seat back, a reclining adjustment mechanism and a seat-position adjustment mechanism. The seat is connected to the seat cushion. The reclining adjustment mechanism adjusts an inclination angle of the seat back with respect to the seat cushion. The reclining adjustment mechanism includes a reclining operating part which is disposed on the seat cushion in a vicinity of a connecting part between the seat cushion and the seat back. The seat-position adjustment mechanism adjusts a position of the seat cushion in a forward/rearward direction. The seat-position adjustment mechanism includes a seat-position operating part which is disposed on the seat cushion below the reclining operating part within a range of a length of the reclining operating part.

7 Claims, 10 Drawing Sheets

VEHICLE SEAT

CROSS-REFERENCE TO RELATED APPLICATIONS

The present application claims priority under 35 U.S.C. §119 to Japanese Patent Application No. 2010-174421 filed Aug. 3, 2010, entitled "Vehicle Seat." The contents of this application are incorporated herein by reference in their entirety.

BACKGROUND OF THE INVENTION

1. Field of the Invention

The present invention is related to a vehicle seat.

2. Description of the Related Art

Many vehicle seats have an operation lever of a reclining adjustment mechanism disposed on the rear side of a seat cushion near a seat back and an operation lever of a seat-position adjustment mechanism disposed on the lower front part of the seat cushion (for example, refer to Japanese Patent No. 3293513).

SUMMARY OF THE INVENTION

According to one aspect of the present invention, a vehicle seat includes a seat cushion, a seat back, a reclining adjustment mechanism and a seat-position adjustment mechanism. The seat is connected to the seat cushion. The reclining adjustment mechanism adjusts an inclination angle of the seat back with respect to the seat cushion. The reclining adjustment mechanism includes a reclining operating part which is disposed on the seat cushion in a vicinity of a connecting part between the seat cushion and the seat back. The seat-position adjustment mechanism adjusts a position of the seat cushion in a forward/rearward direction. The seat-position adjustment mechanism includes a seat-position operating part which is disposed on the seat cushion below the reclining operating part within a range of a length of the reclining operating part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
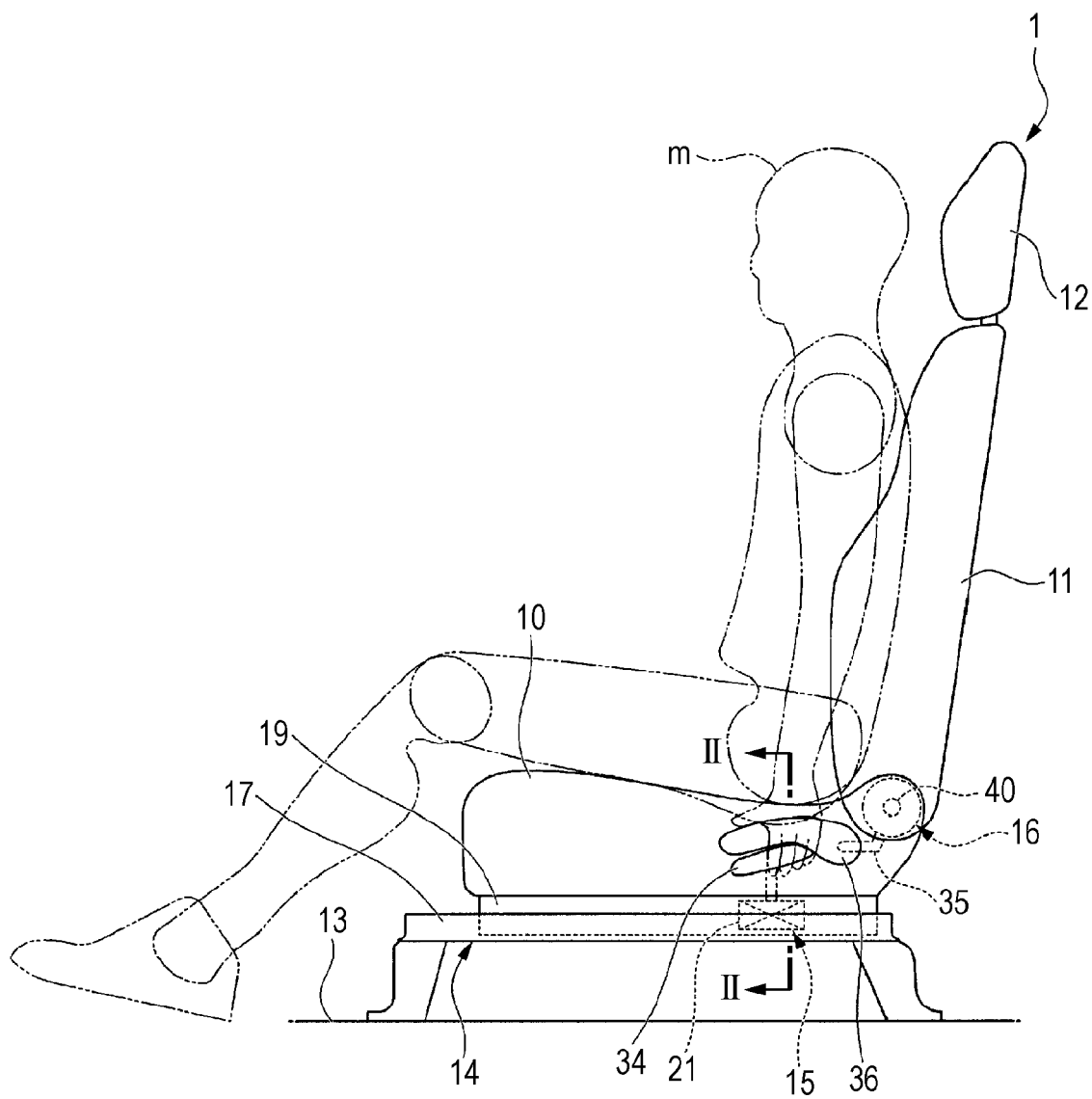
FIG. 1 is a side view of a vehicle seat according to a first embodiment of the present invention.

Embodiments of the present invention will be described below with reference to the drawings, wherein like reference numerals designate corresponding or identical elements throughout the various drawings.

Unless otherwise stated, in the embodiments described below, the forward, rearward, upward, and downward directions respectively correspond to the directions toward the front, rear, top, and bottom of the vehicle.

A first embodiment will be described with reference to FIGS. 1 to 5.

FIG. 1 is a side view of a vehicle seat 1 (hereinafter referred to as "seat 1") according to the first embodiment.

FIG. 1 illustrates a seat cushion 10 that supports the buttocks of a passenger m, a seat back 11 that supports the chest (back) and hip of the passenger m, and a head rest 12 that supports the head and neck of the passenger m.

The seat cushion 10 is attached to left and right paired seat rails 14 on the floor 13 of the vehicle.

The seat back 11 is attached to rear part of the seat cushion 10 in such a manner that it tilts.

A seat-position adjustment mechanism 15 that adjusts the position of the seat cushion 10 in the forward and rearward directions is attached to each of the seat rails 14.

A reclining adjustment mechanism 16 that adjusts the inclination angle of the seat back 11 is attached to the connecting part of the seat cushion 10 and the seat back 11.

Figure 2:
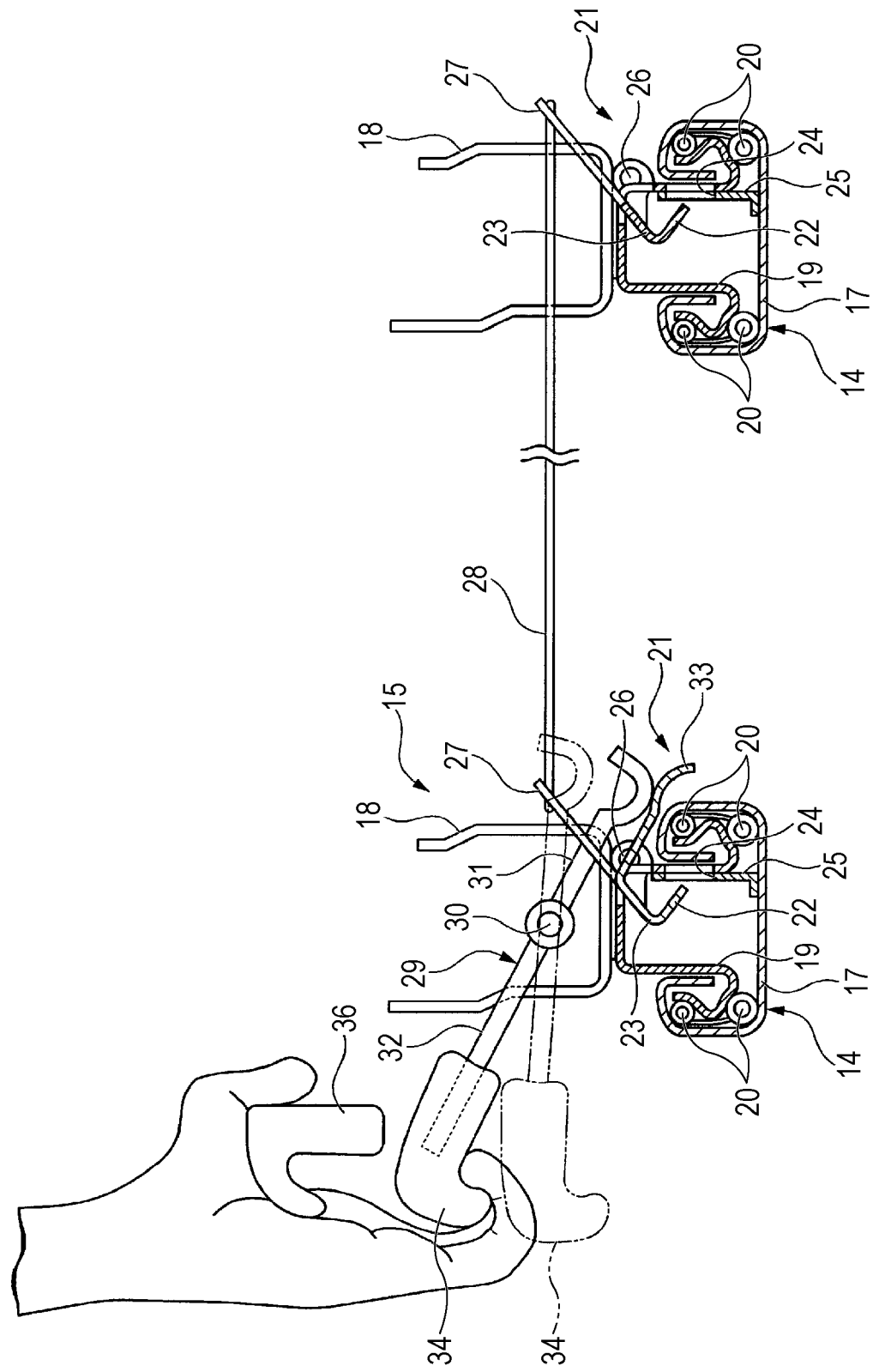
FIG. 2 is a sectional view, taken along line II-II in FIG. 1, of the vehicle seat according to the first embodiment of the present invention.

FIG. 2 is a sectional view of the left and right seat rails 14 and the seat-position adjustment mechanisms 15.

Figure 3:
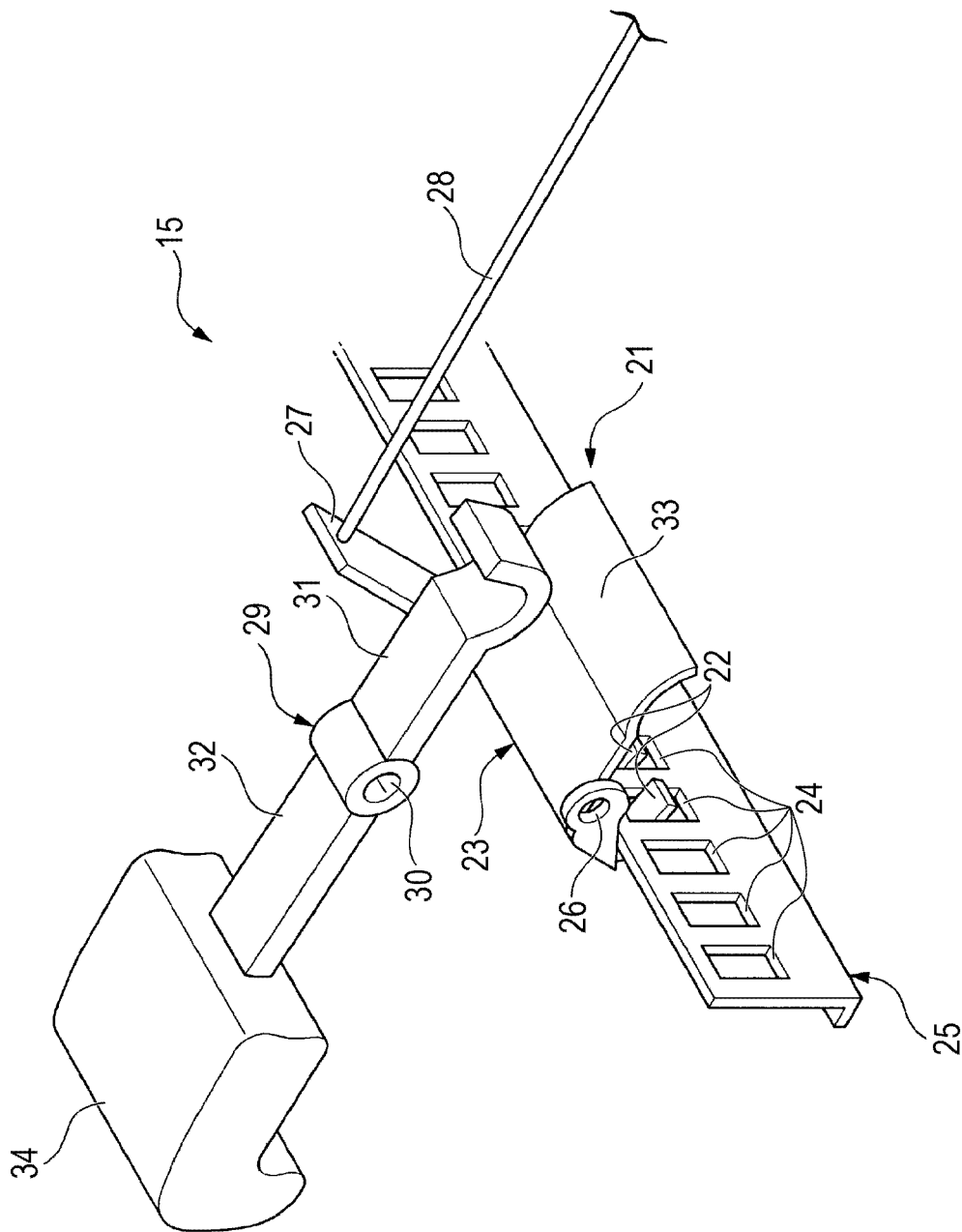
FIG. 3 is a perspective view of the outline of a seat-position adjustment mechanism of the vehicle seat according to the first embodiment of the present invention.

FIG. 3 is an exploded perspective view of essential components of the seat-position adjustment mechanism 15.

As illustrated in the drawings, each of the seat rails 14 includes a lower rail (secured rail) 17 secured to the floor 13 in the forward/rearward direction of the vehicle and an upper rail (movable rail) 19 attached to a seat frame 18 of the seat cushion 10 at the bottom surface of the seat cushion 10.

The lower rail 17 and the upper rail 19 slide in the forward/rearward direction by sliding members 20, such as rollers.

A locking mechanism 21 is an essential portion of the seat-position adjustment mechanism 15, is disposed between the upper rail 19 and the lower rail 17 of the seat rail 14, and secures the upper rail 19 at a desired sliding position.

The locking mechanism 21 includes a latching lever 23 that is supported and slides on the upper rail 19 and has a plurality of locking hooks 22, a locking plate 25 that is disposed on a bottom wall in the lower rail 17 and has a plurality of engagement holes 24, which engage with the locking hooks 22, and a spring (not shown) that urges the latching lever 23 in a direction in which the locking hooks 22 enter the engagement holes 24.

The latching lever 23 is attached to the upper rail 19 with a shaft supporting part 26, which is disposed along the direction of the seat rails 14 in such a manner that the latching lever 23 pivots around the upper rail 19.

The latching lever 23 slides the locking hooks 22 downward around the shaft supporting part 26 and enters desired engagement holes 24 in the locking plate 25 to secure the upper rail 19 in the forward/rearward direction with respect to the lower rail 17 (position of the seat cushion 10 in the forward/rearward direction with respect to the floor 13).

In contrast, the latching lever 23 slides the locking hooks 22 upward and removes the locking hooks 22 from the engagement holes 24 to release the upper rail 19 in the forward/rearward direction with respect to the lower rail 17 (position of the seat cushion 10 in the forward/rearward direction with respect to the floor 13).

An interlocking piece 27 is provided on the latching lever 23.

A connecting rod 28 is connected to the end of the interlocking piece 27 in such a manner that the connecting rod 28 slides.

The connecting rod 28 interlocks the latching levers 23 of the left and right locking mechanisms 21.

The interlocking pieces 27 of the left and right locking mechanisms 21 are connected to both ends of the connecting rod 28, which extends in the seat width direction.

A lever arm 29 that turns the latching lever 23 is attached to the seat frame 18 on a side of the seat cushion 10.

The entire lever arm 29 extends in the seat width direction, and a shaft supporting part 30 is disposed in the direction of the seat rails 14 at about the center in the seat width direction of the lever arm 29.

The lever arm 29 is supported by the shaft supporting part 30 in such a manner that the lever arm 29 pivots around the upper rail 19.

The lever arm 29 includes an inward extending piece 31 that extends inward in the vehicle width direction from the shaft supporting part 30 and an outward extending piece 32 that extends outward in the vehicle width direction.

The inward extending piece 31 and the outward extending piece 32 protrude outside through the sidewalls of the seat frame 18.

An operation input piece 33 extends substantially parallel to the locking hooks 22 is disposed on the latching lever 23 of the locking mechanism 21 (the left locking mechanism 21 in FIG. 2) disposed on a side of the seat frame 18.

The bottom surface of the inward extending piece 31 of the lever arm 29 contacts the upper surface of the operation input piece 33.

The lever arm 29 is disposed near the rear edge of the seat cushion 10.

The outward extending piece 32 of the lever arm 29 protrudes outward from a side surface of the seat cushion 10 near the rear edge of the seat cushion 10.

A position operation knob (seat-position operating part) 34 that is held by the passenger m is disposed at the tip of the outward extending piece 32.

The lever arm 29 is maintained in a substantially horizontal position in a normal state in which it is not used for seat position adjustment.

When the lever arm 29 is used for seat position adjustment, the position operation knob 34 is pulled upward to push the operation input piece 33 of the latching lever 23 downward.

As a result, the locking hooks 22 of the latching lever 23 are removed from the engagement holes 24 of the locking plate 25 to release the upper rail 19.

The reclining adjustment mechanism 16, which is illustrated in FIG. 1, has a known structure and is disposed around a hinge shaft 40 that connects the seat cushion 10 and the seat back 11.

By pulling and turning an operation lever 35 upward, the turning position of the seat cushion 10 can be adjusted.

By returning the operation lever 35 to its initial position, the turning position of the seat cushion 10 is fixed.

A reclining operation knob (reclining operating part) 36 that is held by the passenger m is disposed at the end of the operation lever 35.

The reclining operation knob 36 is disposed near the front of the hinge shaft 40 on the side of the seat cushion 10.

The reclining operation knob 36 is disposed such that the passenger m can reach the reclining operation knob 36 from the outside of the seat cushion 10 to pull the reclining operation knob 36 upward.

The reclining operation knob 36 is disposed such that the reclining operation knob 36 is slightly lower than the seat surface (upper surface) of the seat cushion 10 in the initial position of the reclining operation knob 36 when the reclining operation knob 36 is not operated by the passenger m.

The position operation knob 34 is disposed directly below the reclining operation knob 36 on the side of the seat cushion 10 within a range of the length of the reclining operation knob 36 and within a range in which both the position operation knob 34 and the reclining operation knob 36 are reachable by one hand or, specifically, disposed between the reclining operation knob 36 and the lower rail 17.

More specifically, in this embodiment, the position operation knob 34 is disposed within a range reachable by the passenger's hand such that the base of the thumb contacts the upper surface of the reclining operation knob 36 and the other four fingers contact the lower surface of the position operation knob 34.

The position operation knob 34 does not necessarily have to be disposed directly below the reclining operation knob 36 so long as it is disposed lower than the reclining operation knob 36 and on a side of the rear half of the seat cushion 10.

Figure 4:
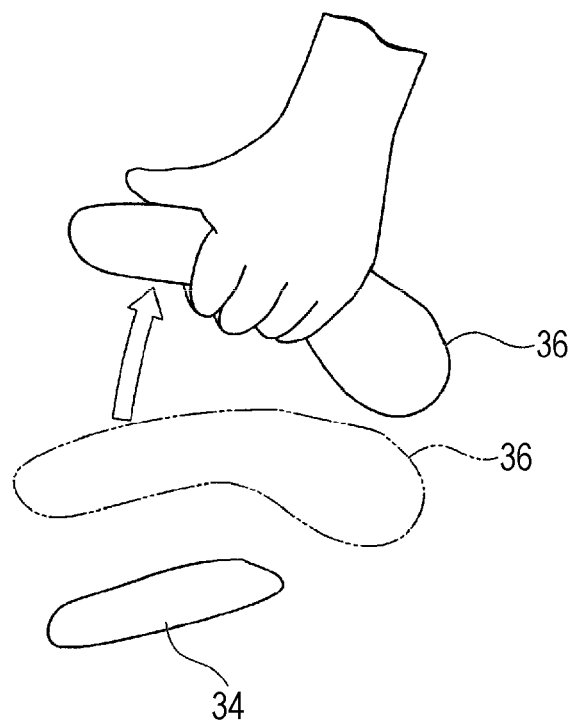
FIG. 4 is a schematic side view of the operation of the vehicle seat according to the first embodiment of the present invention.
Figure 5:
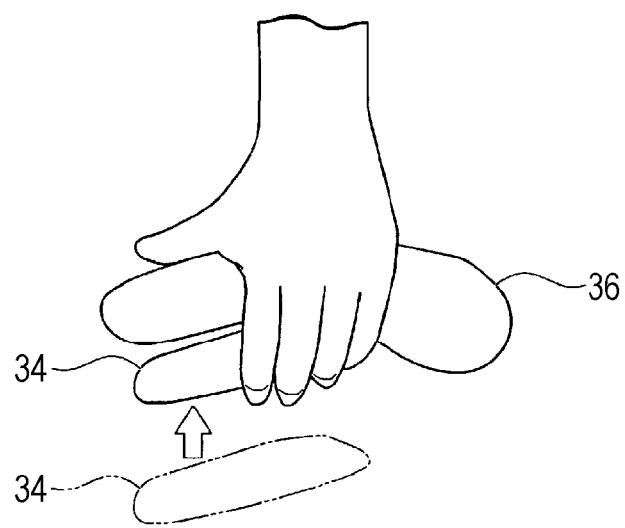
FIG. 5 is a schematic side view of the operation of the vehicle seat according to the first embodiment of the present invention.

FIGS. 4 and 5 are enlarged views of the reclining operation knob 36 and the position operation knob 34 in operation.

As illustrated in the drawings, the reclining operation knob 36 is curved such that substantially the center in the forward/rearward direction of the lower surface is depressed upward, and, when viewed from the side, the thickness of the rear part in the vertical direction is larger than the thickness of the front part.

As illustrated in FIG. 4, the reclining operation knob 36 is operated by tilting the front part upward while pulling and turning the entire reclining operation knob 36 upward.

When viewed from the side, the position operation knob 34 extends substantially linearly in the forward/rearward direction, and the thickness in the vertical direction is substantially constant, except for the rear part.

The length of the position operation knob 34 in the forward/rearward direction is approximately half of that of the reclining operation knob 36, and the thickness of the position operation knob 34 in the vertical direction is substantially smaller than that of the reclining operation knob 36.

The position operation knob 34 is tilted in its initial position such that the rear part is slightly higher.

The position operation knob 34 is operated by pulling it upward, as indicated by the arrow in FIG. 5.

In the configuration described above, when the passenger m seated in the seat 1 adjusts the inclination angle of the seat back 11 and the position of the seat cushion 10 in the forward/rearward direction, as illustrated in FIG. 1, the passenger m sit against the seat back 11 while stretching one hand across the rear part of the seat cushion 10 and grabs both the reclining operation knob 36 and the position operation knob 34, which disposed below the reclining operation knob 36.

As illustrated in FIG. 4, to adjust the inclination angle of the seat back 11 in this state, the passenger m moves the four fingers on the position operation knob 34 to the reclining operation knob 36, which is disposed above the position operation knob 34, holds only the reclining operation knob 36, and pulls the reclining operation knob 36 upward.

In this state, the passenger m adjusts the inclination angle of the seat back 11.

Once the inclination angle is adjusted to a desired angle, the passenger m removes their hand from the reclining operation knob 36.

As illustrated in FIG. 5, to adjust the position of the seat cushion 10 in the forward/rearward direction, the passenger squeezes the reclining operation knob 36 and the position operation knob 34 together so that the operation knobs 36 and 34 move closer to each other.

When the operation knobs 36 and 34 are squeezed together in this way, the reclining operation knob 36 reaches the lower limit position and cannot be moved any further downward.

As a result, the position operation knob 34 is pulled upward in response to the squeezing force.

In this state, the passenger m adjusts the position of the seat cushion 10 in the forward/rearward direction.

Once the seat cushion 10 is set to a desired position in the forward/rearward direction, the passenger m removes the hand from the reclining operation knob 36 and the position operation knob 34.

To adjust the position of the seat cushion 10 in the forward/rearward direction, the passenger m may grab only the position operation knob 34, which is positioned below the reclining operation knob 36, and, in this state, pull the position operation knob 34 upward.

As described above, in the seat 1, the reclining operation knob 36 is disposed on the side of the seat cushion 10 near the hinge shaft 40, and the position operation knob 34 is disposed on the side of the seat cushion 10 below the reclining operation knob 36 within a range in which both the position operation knob 34 and the reclining operation knob 36 are reachable.

In this way, the passenger m can easily operate the reclining operation knob 36 and the position operation knob 34 while sitting back against the seat back 11.

Accordingly, the passenger m can adjust the position of the seat cushion 10 in the forward/rearward direction without leaning forward such as in the case of adjusting a seat according to the related art.

Therefore, the position of the seat cushion 10 in the forward/rearward direction can be adjusted accurately while facilitating the operation and confirming the positional relationship of the upper body of the passenger m in a driving position and the steering wheel, the instrument panel, etc., at the front part of the vehicle.

In the seat 1, the reclining operation knob 36 and the position operation knob 34 are disposed in a range in which both are reachable by one hand.

Therefore, the passenger m can continuously adjust the inclination angle of the seat back 11 and the position of the seat cushion 10 in the forward/rearward direction by hardly changing the position of their hand.

In this way, an optimal position of the seat 1 in the forward/rearward direction and an optimal angle of the seat back 11 for the passenger m can be easily set.

In the seat 1, the reclining operation knob 36 and the position operation knob 34 are disposed in a range in which both are reachable by one hand.

Therefore, by stretching a hand across both the reclining operation knob 36 and the position operation knob 34, the passenger m can grab both the operation knobs 36 and 34 without visually checking the positions of the operation knobs 36 and 34.

Therefore, the possibility of the passenger m erroneously operating the reclining adjustment mechanism 16 and the seat-position adjustment mechanism 15 is reduced.

In the seat 1 according to this embodiment, since the operating directions of the reclining operation knob 36 and the position operation knob 34 are the same, only the reclining operation knob 36 is pulled upward to operate the reclining adjustment mechanism 16, whereas both the reclining operation knob 36 and the position operation knob 34 are squeezed together and pulled upward to operate the seat-position adjustment mechanism 15.

In this way, by completely changing the way of grasping the operation knobs when operating the reclining adjustment mechanism 16 and the seat-position adjustment mechanism 15, erroneous operation by the passenger m can be reliably prevented even when the reclining operation knob 36 and the position operation knob 34 are disposed vertically close to each other.

The operating direction of both the reclining operation knob 36 and the position operation knob 34 may be set downward.

However, as described in this embodiment, when the operating direction of both the operation knobs 36 and 34 is set upwards, the passenger m seated in the seat 1 can apply force to the operation knobs 36 and 34 while sitting naturally in the seat 1, and thus operability is improved.

In this embodiment, the reclining operation knob 36 is curved, whereas the position operation knob 34 disposed below the reclining operation knob 36 is straight.

This difference in shape of the operation knobs 36 and 34 also prevents erroneous operation by the passenger m.

In this embodiment, the difference in length in the forward/rearward direction and thickness in the vertical direction of the operation knobs 36 and 34 and the difference in inclination angle of the operation knobs 36 and 34 in their initial positions are also effective in preventing erroneous operation.

A second embodiment will be described with reference to FIGS. 6 to 9.

In the embodiments described below, components that are the same as those in the first embodiment are represented by the same reference numerals.

The basic configuration of a seat 101 according to this embodiment is substantially the same as the vehicle seat 1 according to the first embodiment, except that the configuration of a seat-position adjustment mechanism 115 and the operating parts differ from the seat-position adjustment mechanism 15 and the operating part according to the first embodiment.

Figure 6:
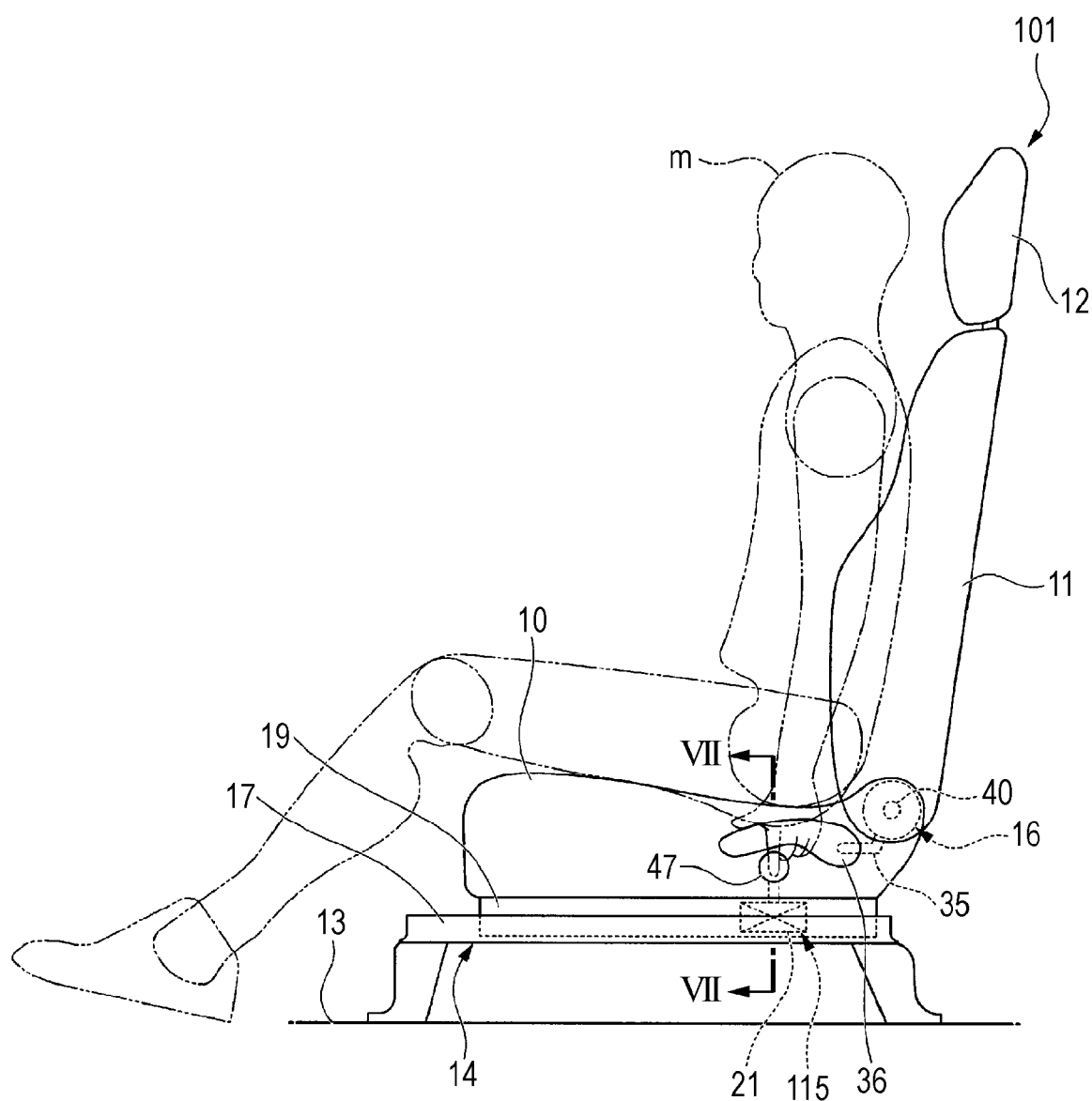
FIG. 6 is a side view of a vehicle seat according to a second embodiment of the present invention.

FIG. 6 is similar to FIG. 1 in that it is a side view of the seat 101.

Figure 7:
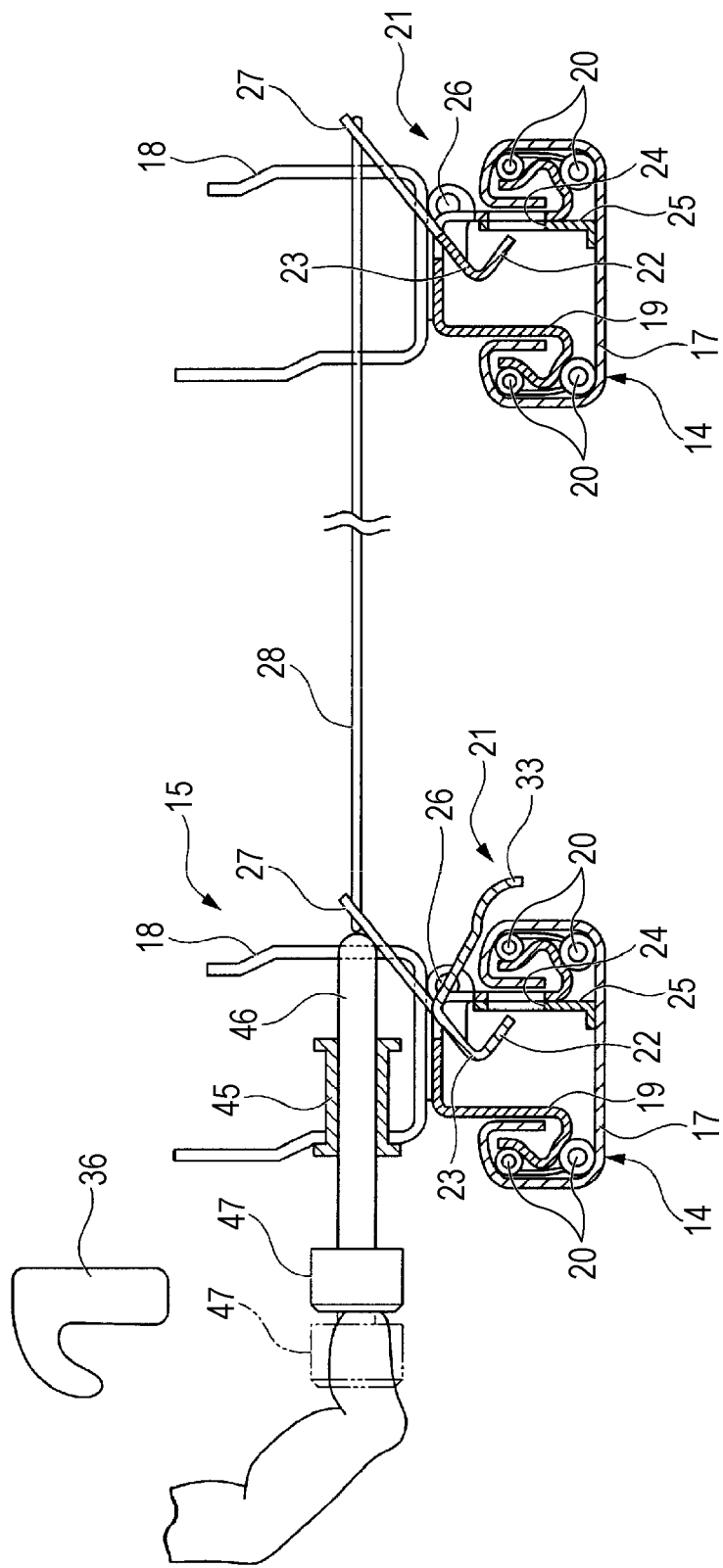
FIG. 7 is a section view, taken along line VII-VII in FIG. 6, of the vehicle seat according to the second embodiment of the present invention.

FIG. 7 is similar to FIG. 2 in that it is a sectional view of left and right seat rails 14 and the seat-position adjustment mechanism 115.

The seat-position adjustment mechanism 115 includes locking mechanisms 21, which are similar to those in the first embodiment, disposed inside the left and right seat rails 14.

Latching levers 23 of the left and the right locking mechanisms 21 are interlocked by a connecting rod 28.

A collar 45 extending in the seat width direction is disposed on the rear part of a seat frame 18 on a side of the seat cushion 10.

The collar 45 supports an operating rod 46 in such a manner that the operating rod 46 moves forward and rearward.

An operation button 47, which is circular when viewed from its front, is integrated with one end of the operating rod 46 protruding from the seat frame 18 outward in the vehicle width direction.

The operation button 47 constitutes a seat-position operating part according to this embodiment.

The other end of the operating rod 46 protruding from the seat frame 18 inward in the vehicle width direction contacts the upper surface of the operation input piece 33 of the latching lever 23 of one of the locking mechanisms 21.

When a passenger pushes the operation button 47 into the side of the seat cushion 10, the operating rod 46 pushes the operation input piece 33 of the latching lever 23 downward, causing the locking hooks 22 of the latching lever 23 to be removed from the engagement holes 24 of the locking plate 25 to release the upper rail 19.

The reclining operation knob 36 is disposed near the front side of the hinge shaft 40 on one of the sides of the seat cushion 10.

The operation button 47 is disposed directly below the reclining operation knob 36 on the side of the seat cushion 10 within a range of the length of the reclining operation knob 36 and within a range in which both the operation button 47 and the reclining operation knob 36 are reachable by one hand or, specifically, is disposed between the reclining operation knob 36 and the lower rail 17.

More specifically, the operation button 47 is disposed within a range reachable by the passenger's hand such that base of the thumb contacts the upper surface of the reclining operation knob 36 and the other four fingers push the operation button 47.

Figure 8:
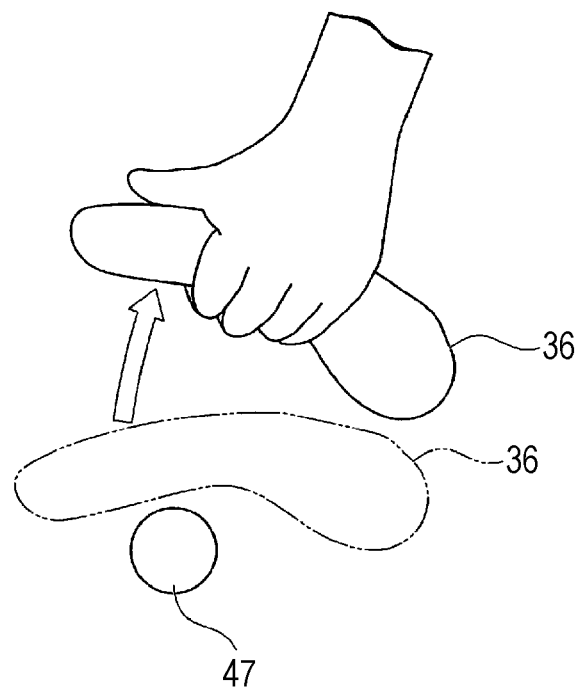
FIG. 8 is a schematic side view of the operation of the vehicle seat according to the second embodiment of the present invention.
Figure 9:
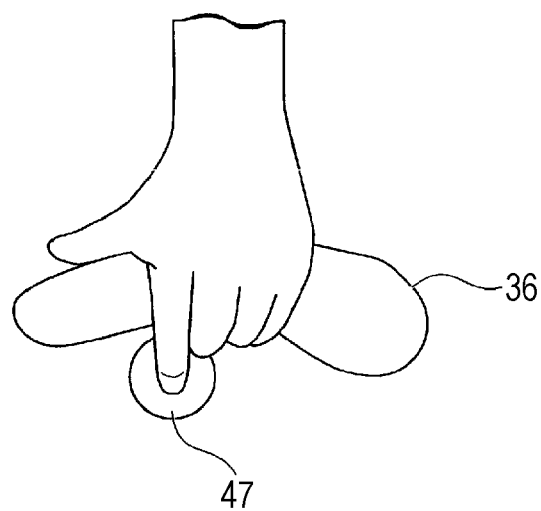
FIG. 9 is a schematic side view of the operation of the vehicle seat according to the second embodiment of the present invention.

FIGS. 8 and 9 are enlarged views of the reclining operation knob 36 and the operation button 47 in operation.

For the passenger m seated in the seat 101 to adjust the inclination angle of the seat back 11, the passenger m, while sitting against the seat back 11, extends a hand along the side of the rear part of the seat cushion 10 and grabs and pulls the reclining operation knob 36 upward, as illustrated in FIG. 8, to adjust the inclination angle of the seat back 11.

To adjust the position of the seat cushion 10 in the forward/rearward direction, the passenger m, while sitting against the seat back 11 and grabbing the reclining operation knob 36 with their thumb, pushes the operation button 47 with the other fingers, as illustrated in FIG. 9, to adjust the position of the seat cushion 10 in the forward/rearward direction.

In the seat 101 according to this embodiment, the reclining operation knob 36 is disposed near the side of the hinge shaft 40 of the seat cushion 10, and the operation button 47 of the seat-position adjustment mechanism 15 is disposed below the position operation knob 34 on the side of the seat cushion 10 within a range in which both the reclining operation knob 36 and the operation button 47 are reachable by one hand.

Therefore, the reclining operation knob 36 and the operation button 47 can be easily operated.

In this embodiment, the reclining operation knob 36 is to be operated by being pulled substantially upward, and the operation button 47, which is a seat-position operating part, is to be operated by being pushed into the side of the seat cushion 10.

Therefore, even when the reclining operation knob 36 and the operation button 47 are disposed vertically close to each other, erroneous operation by the passenger m can be reliably prevented.

FIGS. 10 to 13 illustrate a third embodiment of the present invention.

The configuration of a seat 201 according to this embodiment is substantially the same of the vehicle seat 1 in the first embodiment, except for the operation of a position operation knob (seat-position operating part) 234, which is disposed below the reclining operation knob 36.

Figure 10:
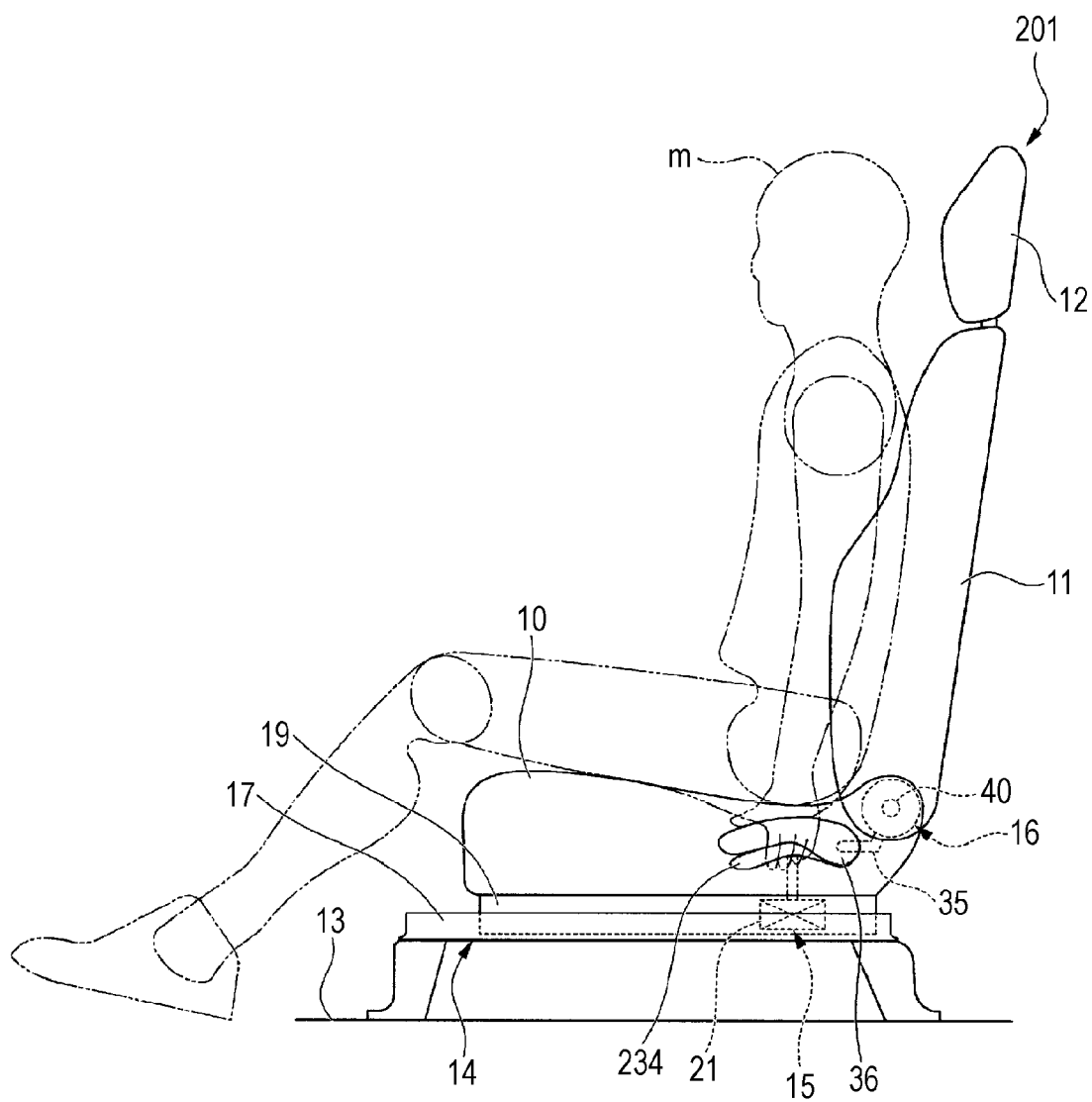
FIG. 10 is a side view of a vehicle seat according to a third embodiment of the present invention.

FIG. 10 is similar to FIG. 1 in that it is a side view of the seat 201.

Figure 11:
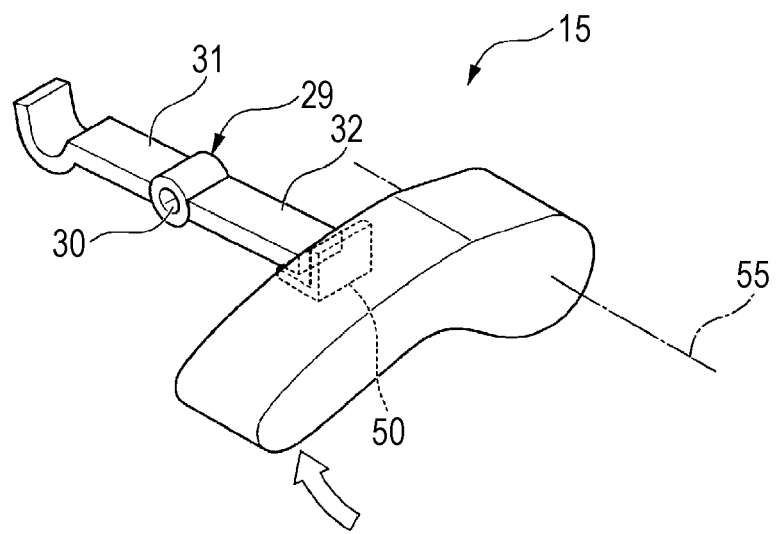
FIG. 11 is a perspective view of the outline of a seat-position adjustment mechanism of the vehicle seat according to the third embodiment of the present invention.

FIG. 11 is a perspective view of part of the position operation knob 234 and the seat-position adjustment mechanism 15.

The position operation knob 234 according to this embodiment is similar to the position operation knob 34 in the first embodiment and is disposed directly below the reclining operation knob 36 on the side of the seat cushion 10 within a range of the length of the reclining operation knob 36 and within a range in which both the position operation knob 234 and the reclining operation knob 36 are reachable by one hand or, specifically, is disposed between the reclining operation knob 36 and the lower rail 17.

As illustrated in FIG. 11, the position operation knob 234 is turned upward around a turning shaft 55, which is provided on the rear edge along the seat width direction.

A substantially L-shaped bracket 50 is disposed on the side of the position operation knob 234 opposing the seat cushion 10.

The upper surface of the extended portion of the bracket 50 contacts the lower surface of the outward extending piece 32 of the lever arm 29.

Therefore, when the position operation knob 234 is turned upward around the rear end of the turning shaft 55, the lock of the seat-position adjustment mechanism 15 is released by the lever arm 29.

Figure 12:
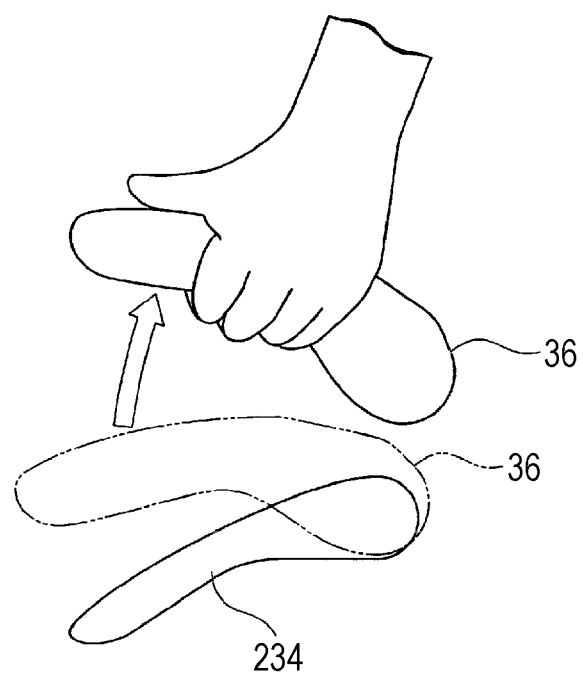
FIG. 12 is a schematic side view of the operation of the vehicle seat according to the third embodiment of the present invention.
Figure 13:
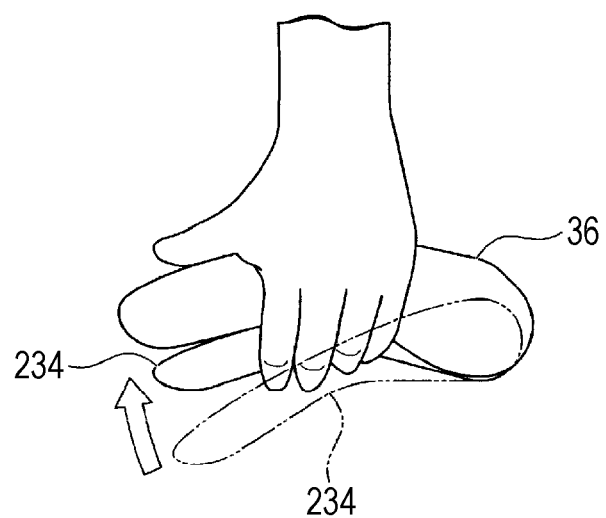
FIG. 13 is a schematic side view of the operation of the vehicle seat according to the third embodiment of the present invention.

FIGS. 12 and 13 are enlarged views of the reclining operation knob 36 and the position operation knob 234 in operation.

For a seated passenger m to adjust the seat 201 while sitting against the seat back 11, the passenger m grabs both the reclining operation knob 36 and the position operation knob 234.

As illustrated in FIG. 12, to adjust the inclination angle of the seat back 11 in this state, the passenger m holds only the reclining operation knob 36 and pulls it upward to adjust the seat back 11 to a desired angle.

As illustrated in FIG. 13, to adjust the position of the seat cushion 10 in the forward/rearward direction, the passenger squeezes the reclining operation knob 36 and the position operation knob 234 together with the hand already placed on both operation knobs 36 and 234 so that the operation knobs 36 and 234 move closer to each other.

At this time, since the reclining operation knob 36 reaches the lower limiting position, only the position operation knob 234, which is disposed below the reclining operation knob 36, turns upward around the turning shaft 55.

In this state, the position of the seat cushion 10 is adjusted in the forward/rearward direction.

In this embodiment, the operation of the position operation knob 234 differs slightly from the operation of the first embodiment.

Basically, however, the same advantages as those in the first embodiment are achieved.

In this embodiment, since the turning shaft 55 is disposed on the little-finger side (rear side of the seat cushion 10) of the hand of the passenger m operating the operation knobs, it is easy for the passenger m to grab the reclining operation knob 36 and the position operation knob 234 and apply force, and thus operability is improved.

The embodiments according to the present invention are not limited, and various modifications may be made without departing from the scope of the invention.

According to the embodiment of the present invention, provides a vehicle seat including a reclining adjustment mechanism (for example, reclining adjustment mechanism 16) configured to adjust an inclination angle of a seat back (for example, seat back 11); and a seat-position adjustment mechanism (for example, seat-position adjustment mechanism 15) configured to adjust a position of a seat cushion (for example, seat cushion 10) in a forward/rearward direction, wherein a reclining operating part (for example, reclining operation knob 36) of the reclining adjustment mechanism and a seat-position operating part (for example, position operation knob 34) of the seat-position adjustment mechanism are disposed on the seat cushion, and wherein the reclining operating part is disposed near a contact part of the seat cushion and the seat back on a side of the seat cushion, and the seat-position operating part is disposed below the reclining operating part on the side of the seat cushion within a range of the length of the reclining operating part.

According to the embodiment of the present invention, the seat-position operating part may be disposed below the reclining operating part within a range reachable together with the reclining operating part.

According to the embodiment of the present invention, since the reclining operating part is disposed near a contact part of the seat cushion and the seat back on a side of the seat cushion, and the seat-position operating part is disposed below the reclining operating part on the side of the seat cushion within a range of the length of the reclining operating part, a seated passenger can easily operate the reclining operating part and the seat-position operating part while sitting against the seat back without moving the position of their hand.

In particular, according to the embodiment of the present invention, since the seated passenger can operate the seat-position operating part while sitting against the seat back, the passenger can accurately adjust the position of the seat in the forward/rearward direction while confirming the positional relationship of the upper body of the passenger in a driving position and the front part of the vehicle.

Accordingly, the frequency of adjusting the seat position in the forward/rearward direction can be reduced.

According to the embodiment of the present invention, the reclining operating part and the seat-position operating part may be operated in substantially the same direction.

According to the embodiment of the present invention, since the reclining operating part and the seat-position operating part may be operated by being pulled substantially upward by a passenger seated on the seat cushion, a first operating part can be operated by grabbing both operating parts, and a second operating part can be operated by grabbing and moving only the second operating part.

According to the embodiment of the present invention, since the operation of the reclining operating part and the seat-position operating part can be changed, even when both operating parts are disposed vertically close to each other, erroneous operation by the passenger can be reliably prevented.

According to the embodiment of the present invention, the reclining operating part and the seat-position operating part may be operated by being pulled substantially upward by a passenger seated on the seat cushion.

According to the embodiment of the present invention, since the reclining operating part and the seat-position operating part may be operated by being pulled substantially upward by a passenger seated on the seat cushion, a seated passenger can easily operate both operating parts.

According to the embodiment of the present invention, the reclining operating part and the seat-position operating part may have grips of different shapes.

According to the embodiment of the present invention, since the reclining operating part and the seat-position operating part may have grips of different shapes, even when both operating parts are disposed vertically close to each other, erroneous operation by the passenger can be reliably prevented.

According to the embodiment of the present invention, the reclining operating part may be operated by being pulled substantially upward, and the seat-position operating part may be operated by being pushed into the side of the seat cushion.

According to the embodiment of the present invention, since the reclining operating part may be operated by being pulled substantially upward, and the seat-position operating part may be operated by being pushed into the side of the seat cushion, even when both operating parts are disposed vertically close to each other, erroneous operation by the passenger can be reliably prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle seat comprising:
   a seat cushion;
   a seat back connected to the seat cushion;
   a reclining adjustment mechanism to adjust an inclination angle of the seat back with respect to the seat cushion, the reclining adjustment mechanism including a reclining operating part which is disposed on the seat cushion in a vicinity of a connecting part between the seat cushion and the seat back; and
   a seat-position adjustment mechanism to adjust a position of the seat cushion in a forward/rearward direction, the seat-position adjustment mechanism including a seat-position operating part which is disposed on the seat cushion below the reclining operating part within a range of a length of the reclining operating part,
   wherein the reclining operating part includes a curved portion having an upper surface extending in the forward/rearward direction and a lower surface depressed upward at substantially a center in the forward/rearward direction of the lower surface,
   wherein the reclining operating part is configured to be operated by being pulled upward at a front end of the reclining operating part by a passenger seated on a rear part of the seat cushion,
   wherein, when the reclining operating part reaches a lower limit position at which the reclining operating part cannot be operated further downward, the seat-position operating part is situated below the curved portion and is vertically aligned with and closely adjacent to the curved portion of the upper operating part, and wherein the reclining operating part and the seat-position operating part are disposed independently on the seat cushion and separatable from one another by the passenger pulling the reclining operating part upward.

2. The vehicle seat according to claim 1, wherein the seat-position operating part is disposed below the reclining operating part.

3. The vehicle seat according to claim 1, wherein the reclining operating part and the seat-position operating part are configured to be operated in substantially a same direction.

4. The vehicle seat according to claim 3, wherein the seat-position operating part is configured to be operated by being pulled substantially upward by the passenger seated on the seat cushion.

5. The vehicle seat according to claim 4, wherein the reclining operating part has a reclining grip, the seat-position operating part has a seat-position grip, and the reclining grip and the seat-position grip have different shapes from each other.

6. The vehicle seat according to claim 4, wherein the reclining operating part has a reclining grip having a first longitudinal axis, the seat-position operating part has a seat-position grip having a second longitudinal axis, and the first longitudinal axis and the second longitudinal axis are not parallel to each other.

7. The vehicle seat according to claim 1, wherein the seat-position operating part is configured to be operated by being pushed into the side of the seat cushion.

\* \* \* \* \*